(12) United States Patent
Yoshida et al.

(10) Patent No.: US 7,222,409 B2
(45) Date of Patent: May 29, 2007

(54) METHOD OF MANUFACTURING A SMALL VIBRATION MOTOR

(75) Inventors: Koji Yoshida, Chiba (JP); Shun Kayama, Saitama (JP); Katsuhiro Yoneyama, Chiba (JP); Yukiko Shimizu, Saitama (JP)

(73) Assignee: Sony Corporation (JP)

( * ) Notice: Subject to any disclaimer, the term of this patent is extended or adjusted under 35 U.S.C. 154(b) by 289 days.

(21) Appl. No.: 11/052,929

(22) Filed: Feb. 9, 2005

(65) Prior Publication Data

US 2005/0140223 A1 Jun. 30, 2005

Related U.S. Application Data

(62) Division of application No. 10/624,603, filed on Jul. 23, 2003, now Pat. No. 7,157,822.

(30) Foreign Application Priority Data

Jul. 30, 2002 (JP) .......................... P2002-220889

(51) Int. Cl.
*H02K 15/02* (2006.01)
*H02K 15/10* (2006.01)

(52) U.S. Cl. ..................... 29/598; 29/596; 29/597; 29/606; 29/607; 310/71; 310/81; 310/89; 310/67 R; 361/807; 361/816

(58) Field of Classification Search .......... 29/596–598, 29/606, 607; 310/71, 81, 89, 67 R; 361/807, 361/816
See application file for complete search history.

(56) References Cited

U.S. PATENT DOCUMENTS 6,274,955 B1 * 8/2001 Satoh et al. .................. 310/71
6,326,711 B1 * 12/2001 Yamaguchi et al. .......... 310/81

FOREIGN PATENT DOCUMENTS

JP           10-248203         9/1998

* cited by examiner

*Primary Examiner*—A. Dexter Tugbang
*Assistant Examiner*—Tim Phan
(74) *Attorney, Agent, or Firm*—Rader Fishman & Grauer PLLC; Ronald P. Kananen

(57) ABSTRACT

A driver IC and passive parts, which convert a direct current voltage into a three-phase voltage, and an FP coil for cyclically generating a magnetic field through the driver IC are mounted on a flexible substrate, which constitutes a small vibration motor. The driver IC is a so-called bare chip in which a circuit section is exposed and is not molded with resin and the like. Magnets and an unbalance weight are installed on a yoke having a shaft. The FP coil and the magnet are placed so as to face each other. A cover is caulked to fixed to a bottom plate. Thus, the vibration motor can be miniaturized and thinned. Moreover, the vibration motor can be automatically manufactured, and installing them to an electronic apparatus can be automatically performed.

6 Claims, 12 Drawing Sheets

FIG.11A    FIG.11B    FIG.11C
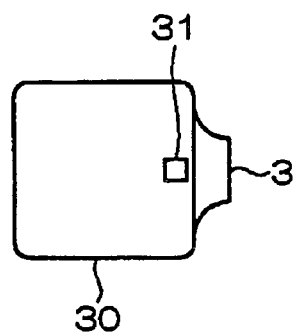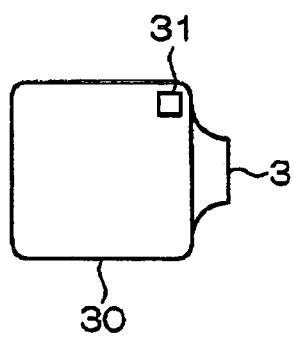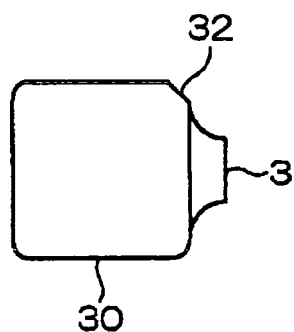
FIG.12A
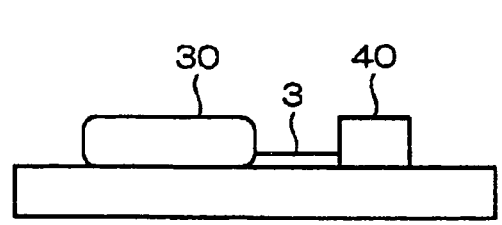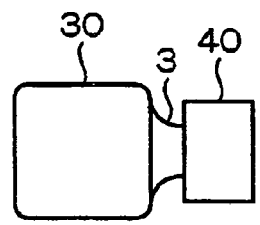
FIG.12B
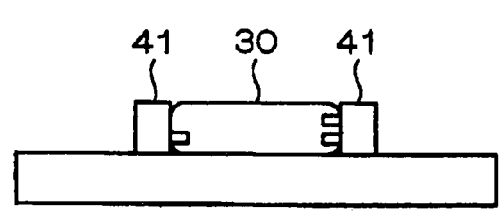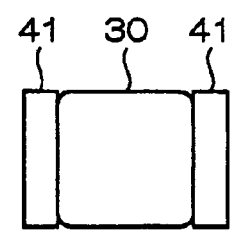
FIG.12C
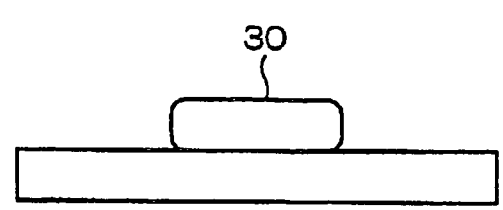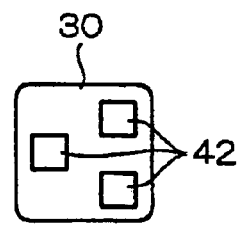

FIG.14A
PRIOR ART
FIG.14B
PRIOR ART
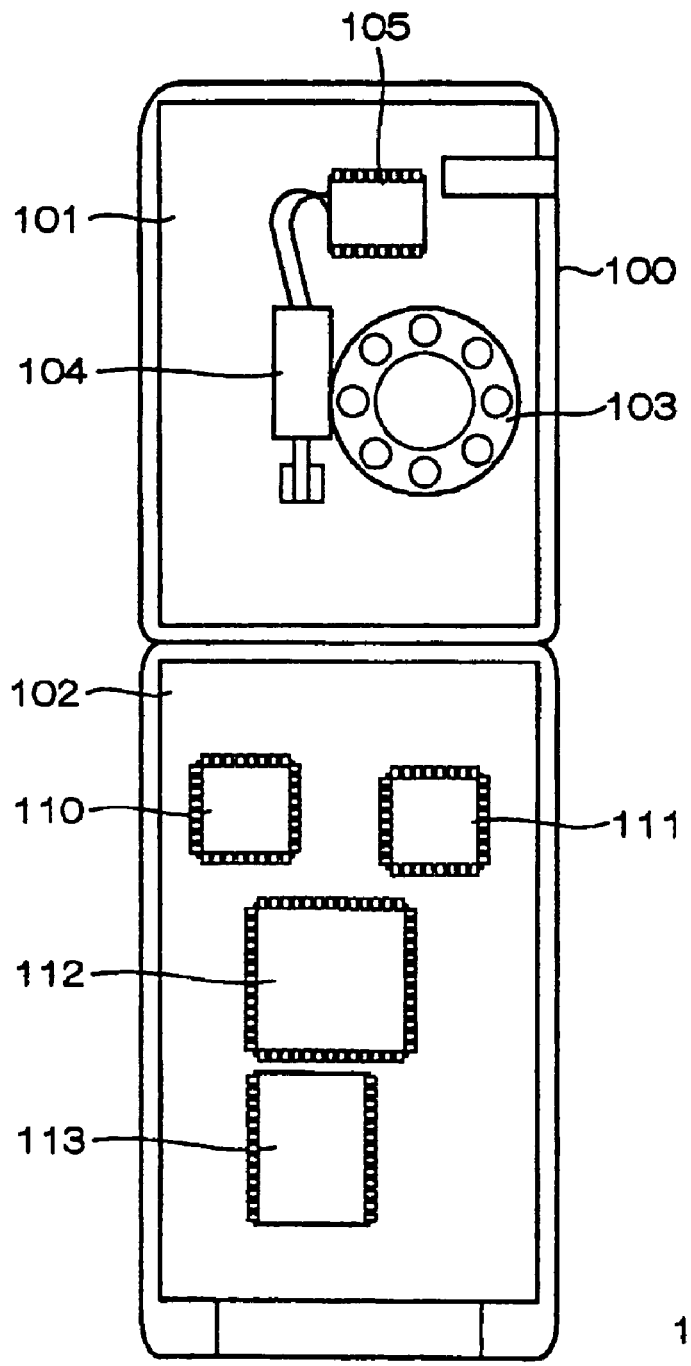
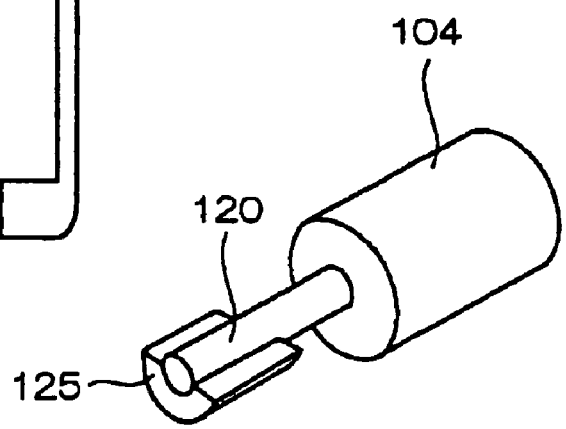

METHOD OF MANUFACTURING A SMALL VIBRATION MOTOR

CROSS REFERENCE TO RELATED APPLICATIONS

This present application is a divisional application of patent application Ser. No. 10/624,603 filed on Jul. 23, 2003, now U.S. Pat. No. 7,157,822.

The present document is based on Japanese Priority Document JP2002-220889, filed in the Japanese Patent Office on Jul. 30, 2002, the entire contents of which being incorporated herein by reference.

BACKGROUND OF THE INVENTION

1. Field of the Invention

The present invention relates to a small vibration motor for generating vibrations, which is built in an electronic apparatus, such as a mobile telephone, a PDA and the like, and to a method of manufacturing the same.

2. Description of Related Art

Conventionally, an electronic apparatus such as the mobile telephone, the PDA and the like includes a mechanism of a so-called silent mode to notify an incoming call through vibrations, and an alarm to notify a predetermined time through vibrations, and the like. As a mechanism for generating a vibration, a vibration actuator is built into such an electronic apparatus.

FIG. 14A is a schematic view showing the inner structure of a mobile telephone in which a vibration motor serving as a conventional vibration actuator is built. FIG. 14B is a schematic view showing the appearance of the vibration motor. As shown in FIG. 14A, printed circuit boards (motherboards) 101, 102 are mounted within the mobile telephone 100. A speaker 103 and a vibration motor 104 are connected to the side of the printed circuit board 101. The vibration motor 104 is driven by a driver IC 105 mounted on the printed circuit board 101. On the other hand, a power supply IC 110, a converter IC 111, an MPU 112, a memory IC 113 and the like are mounted on the side of the printed circuit board 102.

The illustrated vibration motor 104 is a motor with a brush. As shown in FIG. 14B, a weight 125 is fixed around an output shaft 120. When the vibration motor 104 is driven, the output shaft 120 is rotated, and the weight 125 is eccentrically rotated. The eccentric rotation of the weight 125 causes rotationally unbalanced energy to be generated as a vibration component.

SUMMARY OF THE INVENTION

Conventionally, when a motor with a brush is used as the vibration motor, the rotational defect caused by a so-called slit-short can not be made zero. Thus, this is a problem with the reliability of a vibration generation operation.

Also, in view of the internal volume of a portable apparatus and the like, it is naturally desired to have a smaller vibration motor. A motor body can be reduced to, for example, a diameter of about 3.5 mm. However, a problem may occur if the diameter of the motor body is made smaller. That is, the diameter of the weight for generating the rotational unbalanced energy becomes too small to generate enough vibrations, and thus the vibration component decreases. In particular, recently, portable apparatuses, such as the mobile telephone, the PDA and the like tend to be thinned. Accordingly, this causes a problem that fitting a cylindrical vibration motor to such a thinned portable apparatus is difficult.

Further, from the viewpoint of the battery life of a portable apparatus such as the mobile telephone and the like, obviously it is desirable to lower the electric power consumption. However, this has a problem that miniaturization of the motor body brings about increases in the rotational number and the electric power consumption.

Moreover, the assembly of the conventional vibration motor into the electronic apparatus must rely on manpower. Thus, automation thereof is difficult.

Accordingly, there has been a need to provide a smaller vibration motor that may be miniaturized, thinned and automatically assembled into an electronic apparatus and a method of manufacturing the same.

In order to attain the above-mentioned subjects, a small vibration motor according to the present invention is characterized by including: a rotor yoke in which an unbalance weight and a magnet are placed and which is fixed to a shaft; a driving torque-generating coil that is placed on a substrate so as to face the magnet; driving electronic parts placed on the substrate, which includes an integrated circuit composed of non-molded bare chips, supply an alternating current to the driving torque generating coil to rotate the rotor yoke around the shaft; a bottom plate which supports the substrate and to which a radial bearing to which the shaft is engaged is fixed; and a cover for covering the rotor yoke, the driving torque-generating coil and the driving electronic parts, which is adhered to the bottom plate.

Also, as the preferable embodiment, in the small vibration motor, the substrate may be constituted by a flexible substrate, and the driving torque generating coil may be electrically connected to the flexible substrate through three terminals.

Also, as the preferable embodiment, the small vibration motor may include a terminal that is formed on a substrate protruded from the package and engaged with a connector mounted on a motherboard and thereby electrically connected.

Also, as the preferable embodiment, the small vibration motor may include a terminal that is placed in the cover or the bottom and engaged with a socket mounted on a motherboard and thereby electrically connected.

Also, as the preferable embodiment, the small vibration motor may include a land that is formed on a surface of the cover or the bottom in contact with a motherboard and electrically connected to another land formed on the motherboard.

In order to attain the above-mentioned subjects, a method of manufacturing a small vibration motor according to the present invention is characterized by including the steps of: mounting driving electronic parts and a driving torque-generating coil on a board; placing a magnet on a rotor yoke so as to face the driving torque-generating coil, in a rotor composed of the rotor yoke and a shaft; placing an unbalance weight at a part of the rotor yoke; fixing a radial bearing to a bottom plate; installing a bottom plate on which the radial bearing is placed to the substrate; installing the rotor to the radial bearing that is engaged with the shaft; and packaging by covering the substrate, the driving electronic parts and the rotor with a cover, and adhering the cover to the bottom plate.

Also, as the preferable embodiment, the method of manufacturing the small vibration motor may be characterized in that as the driving electronic parts, at least an integrated circuit composed of non-molded bare chips is mounted on the substrate.

Also, as the preferable embodiment, the method of manufacturing the small vibration motor may be designed such that the board is constituted by a flexible substrate and the driving torque generating coil is electrically connected to the flexible substrate through three terminals.

Also, as the preferable embodiment, the method of manufacturing the small vibration motor may include a step of forming a terminal on a substrate protruded from the package, which is engaged with a connector mounted on a motherboard and thereby electrically connected.

Also, as the preferable embodiment, the method of manufacturing the small vibration motor may include a step of placing a terminal, which is engaged with a socket mounted on a motherboard and thereby electrically connected, on the package.

Also, as the preferable embodiment, the method of manufacturing the small vibration motor may include a step of forming a land on a surface in contact with the motherboard of the package, which is electrically connected to another land formed on a motherboard.

In the present invention, the driving electronic parts and the driving torque generating coil are mounted on the board. In the rotor composed of the rotor yoke and the shaft, the magnets are placed so as to face the driving torque generating coil in the rotor yoke. The unbalance weight is placed at a part of the rotor yoke. The radial bearing is fixed to the bottom plate. The bottom plate on which the radial bearing is placed is installed to the board. The shaft is engaged with the radial bearing, and the rotor is also installed on the radial bearing. Moreover, the board, the driving electronic parts and the rotor are covered with the cover. Then, the cover is adhered to the bottom plate to be packaged. Thus, the vibration motor can be miniaturized and thinned. Moreover, it is possible to carry out automatically the manufacturing process for the vibration motor and mounting the motor to an electronic apparatus.

BRIEF DESCRIPTION OF THE DRAWINGS

The above and other objects, features and advantages of the present invention will become more apparent from the following description of the presently preferred exemplary embodiments of the present invention taken in conjunction with the accompanying drawings, in which:

FIGS. 11A to 11C are schematic views explaining a process for manufacturing a small vibration motor;

FIGS. 12A to 12C are schematic views showing an example of a method of mounting a small vibration motor 30 onto a motherboard;

FIGS. 14A, 14B are schematic views showing the inner structure of a mobile telephone in which a vibration motor serving as a conventional vibration actuator is built.

DESCRIPTION OF THE PREFERRED EMBODIMENTS

An embodiment of the present invention will be described below with reference to the attached drawings.

A. Structure of Small Vibration Motor

Figure 1A:
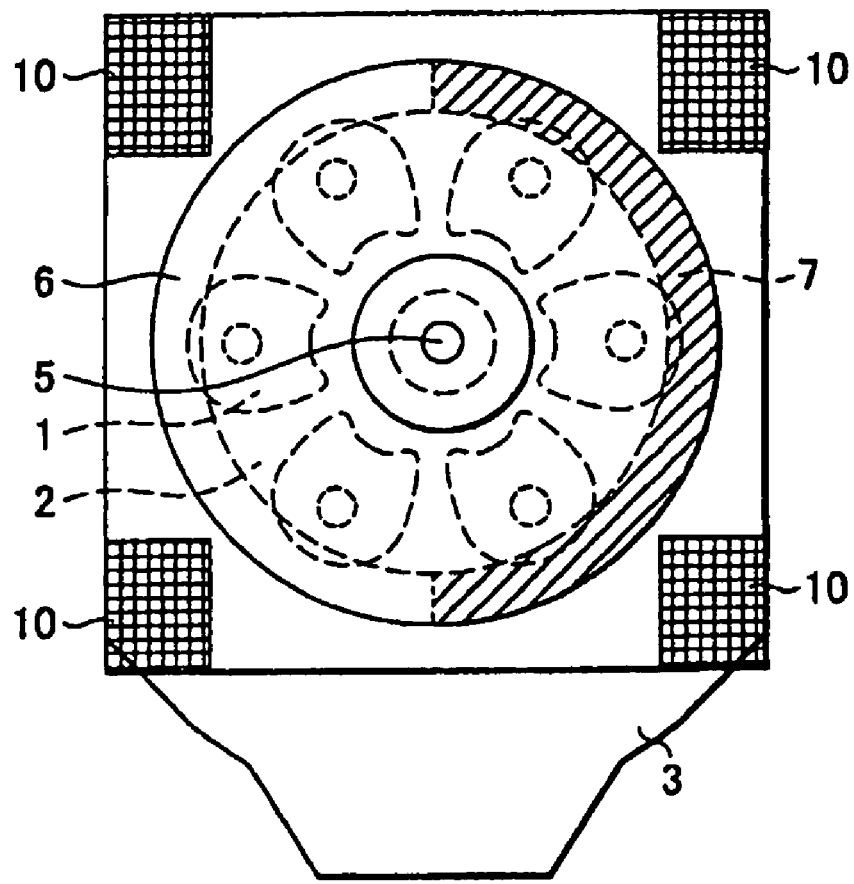
FIGS. 1A, 1B are schematic views showing a structure of a small vibration motor according to an embodiment of the present invention.
Figure 1B:
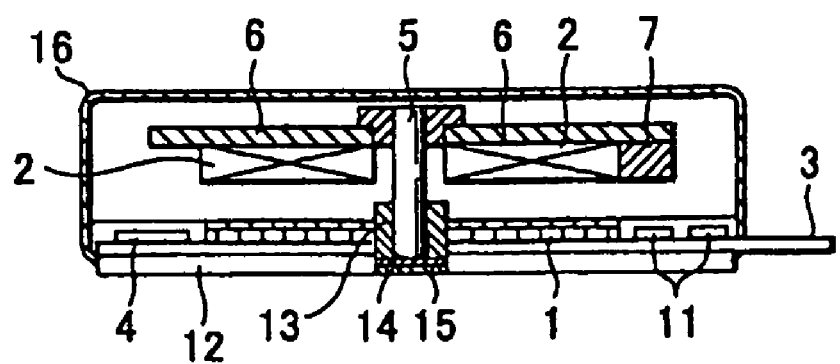

FIGS. 1A, 1B are schematic views showing the structure of a small vibration motor according to the embodiment of the present invention. An FP (Flexible Printed) coil 1 and a magnet 2 are placed facing each other. The FP coil 1 is constituted by a wiring layer composed of a plurality of layers. A signal inputted through a flexible substrate 3 is converted into a three-phase voltage by a driver IC 4 so that a magnetic field is cyclically generated. The magnet 2 is linked to a yoke 6 having a shaft 5. The rotational magnetic field of the FP coil 1 rotates the magnet 2 and the yoke 6. An unbalance weight 7 is eccentrically installed to the yoke 6. The rotation of the unbalance weight 7 generates an unbalanced component to thereby generate a vibration.

Notches 10 are formed at the four corners of the FP coil 1, and the flexible substrate 3 is exposed there. The driver IC 4, passive parts (C, R) 11 and the like are mounted on the notches 10. The flexible substrate 3 is made of polyimide as the base material, and that wiring surface is treated with Cu+Ni+Au.

The shaft 5 is supported by a radial bearing 13 installed to a bottom plate 12, a thrust bearing 14 and a thrust bearing holder 15. The radial bearing 13 is made of sintered metal in which, for example, copper-based, iron-steel-based or iron-based oil is impregnated, and it is the cylindrical shaped member. Incidentally, the radial bearing 13 may be made of resin.

Also, a cover 16 is caulked and soldered and thereby fixed to the bottom plate 12. The top surface of the cover 16 is flat such that the small vibration motor can be assembled (absorbed) by a robot arm and the like when it is mounted onto the motherboard. Also, a part of the flexible substrate 3 is protruded so as to be wired to the motherboard. However, having this protrusion is not the essential condition.

The small vibration motor according to this embodiment, as mentioned above, has the approximate dimension of 8.6×8.6 mm, the thickness of 1.9 mm, and the volume is about 140 mm$^3$. The conventional motor with the brush has the dimension of about 300 to 500 mm$^3$. Thus, as compared with the conventional motor, the small vibration motor according to this embodiment can have its volume reduced substantially equal to ½ to ⅓.

B. Process for Manufacturing Small Vibration Motor

The process for manufacturing the above-mentioned small vibration motor will be described below. Here, FIGS. 2A to 2D are conceptual views showing the process for manufacturing the driver IC 4. Also, FIGS. 3 to 6 are flowcharts showing the entire process for manufacturing the small vibration motor. Moreover, FIGS. 7A to 11C are schematic views explaining the process for manufacturing the small vibration motor.

B-1. Process for Manufacturing Driver IC

Figure 2A:
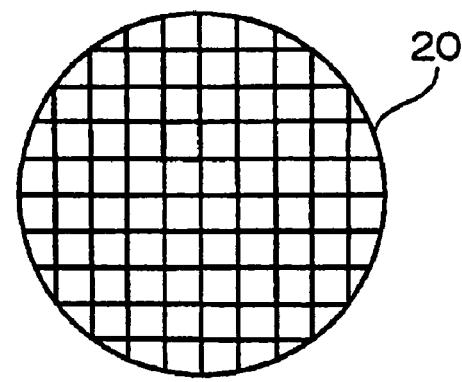
FIGS. 2A to 2D are conceptual views showing a process for manufacturing a driver IC 4.
Figure 2B:
Figure 2C:
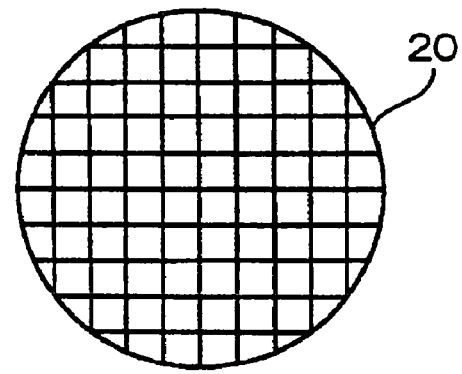
Figure 2D:
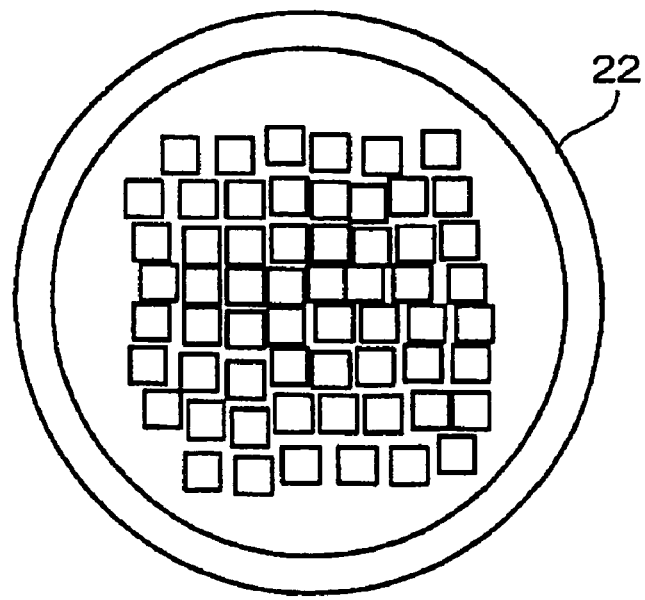

At first, as shown in FIG. 2A, the necessary circuit is formed on a Si wafer 20 by a typical process such as a photo processing and the like. After that, as shown in FIG. 2B, protrusion electrodes 21 are formed thereon. Next, as shown in FIG. 2C, chips are diced one by one and made into pieces by an extension ring 22, as shown in FIG. 2D. The driver IC is not a typical package IC (an IC molded with resin and the like), but it is a so-called bare chip in which a circuit section is exposed. Also, the protrusion electrode 21 can be formed by an Au plating, a Ni plating, an Au stud bumping method, or a solder bumping method or the like. Such a protrusion electrode can be flexible about the supplying condition and the inspecting method of the wafer.

B-2. Flexible Substrate Process

Figure 3:
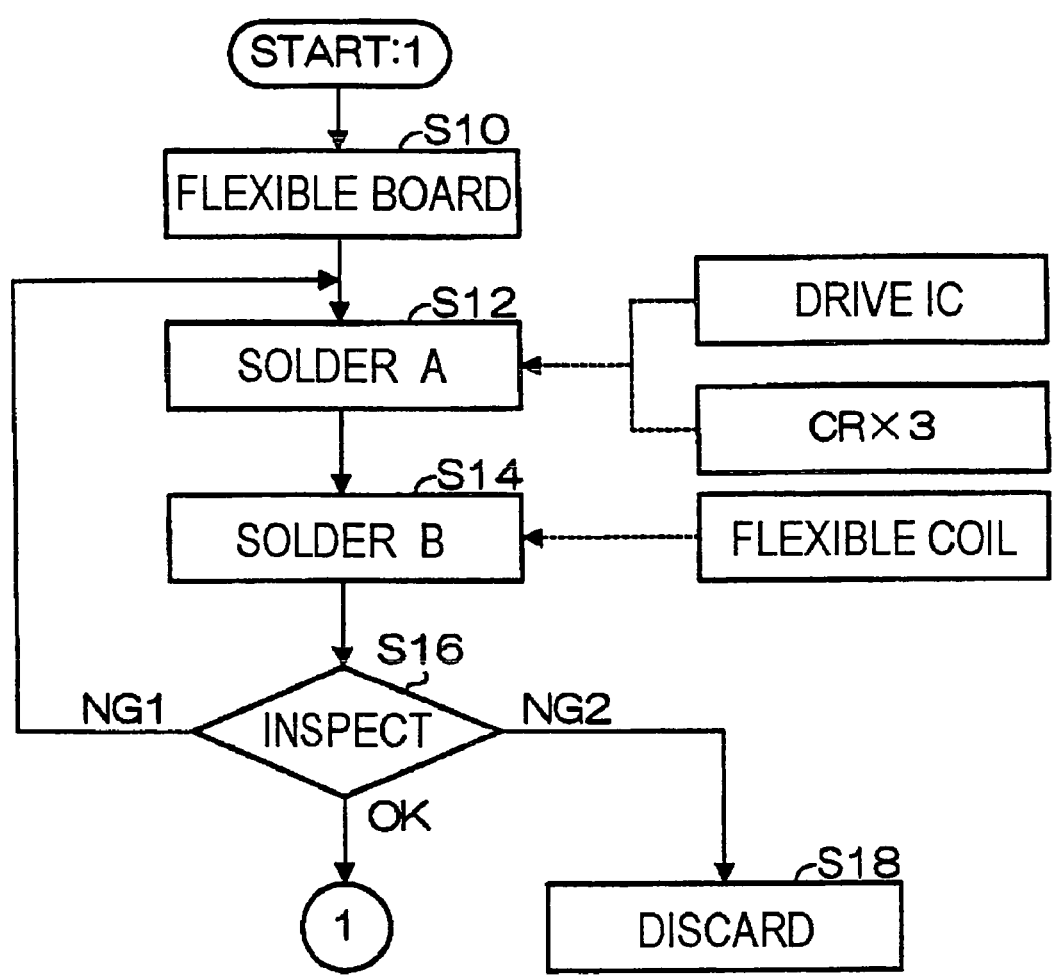
FIG. 3 is a flowchart showing a process for manufacturing a small vibration motor.
Figure 7A:
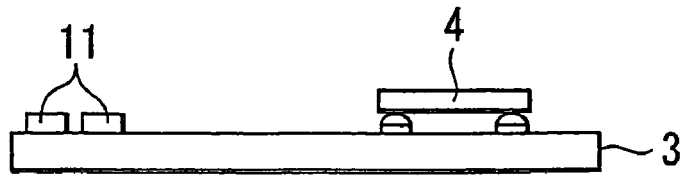
FIGS. 7A, 7B are schematic views explaining a process for manufacturing a small vibration motor.
Figure 7B:
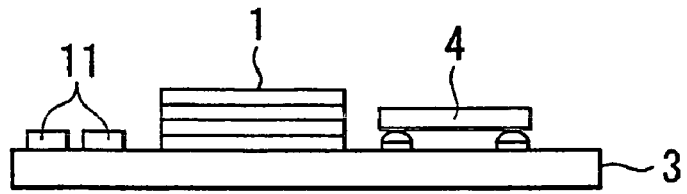

On the other hand, a flexible substrate manufactured in a different step (not shown) is prepared (Step S10 in FIG. 3). At first, as shown in FIG. 7A, the driver IC (bare chip) 4 and the passive elements (C, R) 11 are placed at predetermined positions on the flexible substrate 3. Soldering (reflow) is performed thereon, and flux components contained in paste are washed. Then, underfill resin is coated to reinforce mechanically the driver IC 4. Again, the resin is cured at a thermal curing process (Step S112). Next, as shown in FIG. 7B, the FP coil 1 manufactured in a different process is placed at a predetermined position, and soldering (reflow) is performed thereon (Step S14).

There are three connection portions between the FP coil 1 and the flexible substrate 3, and there are also only three connection terminals to the motherboard (not shown) through the flexible substrate 3. Thus, although the vibrating section and the driver IC 4 are electrically connected, this is not a strong vibrator, and this has the action of attenuating the vibration generated by the flexible substrate 3 itself. Hence, it is possible to suppress the mechanical stress on the mounted portion. Then, the circuit is inspected (Step S16). If the circuit contains any repairable defect, it is returned to the step S12 in order to repair it by carrying out soldering and the like once again and then reinspected. On the other hand, if it contains any defect that can not be repaired, it is discarded (Step S18). Also, if the inspected result is satisfactory, the operational flow proceeds to a next process, which will be described later.

B-3. Process for Installing Radial Bearing

Figure 4:
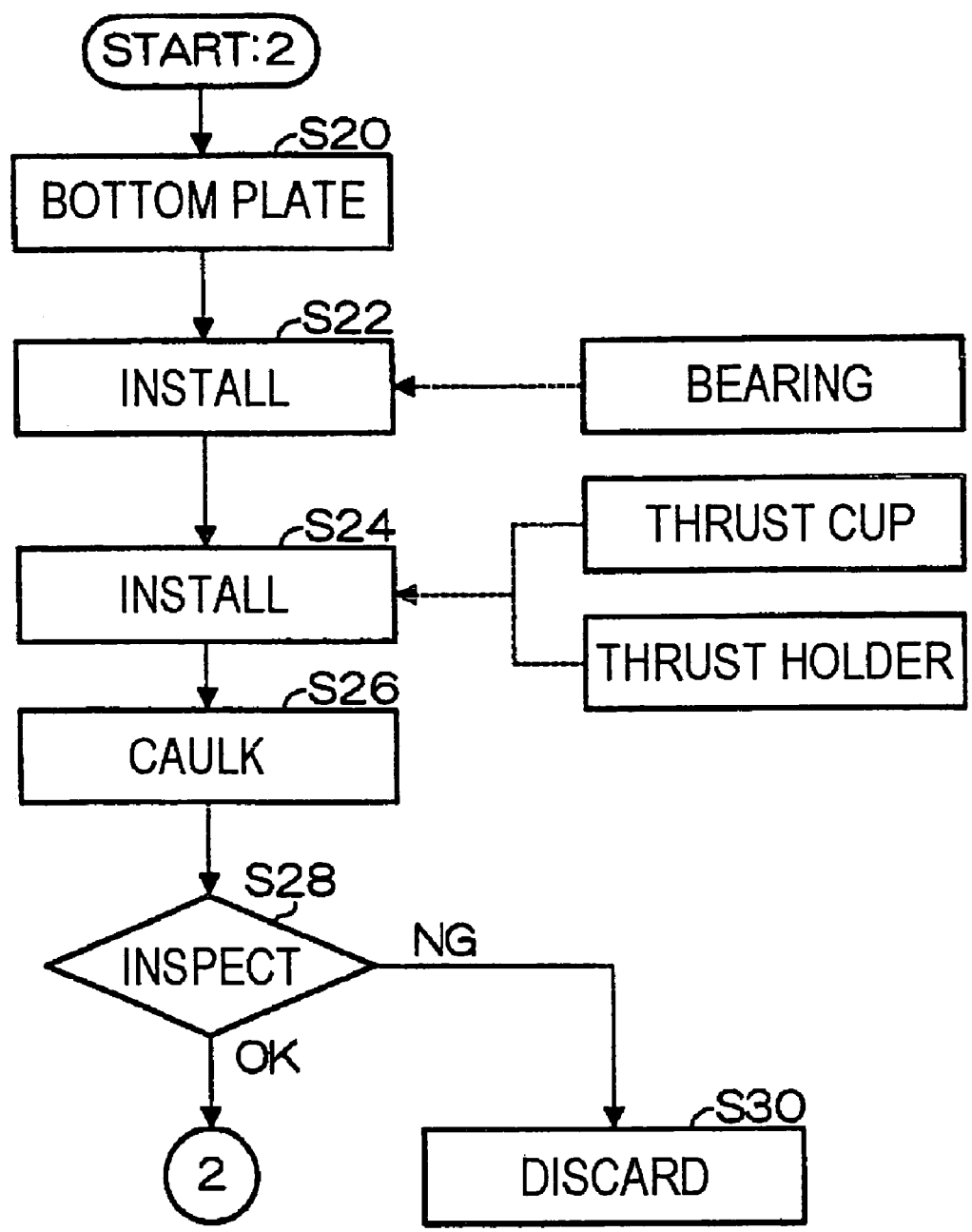
FIG. 4 is a flowchart showing a process for manufacturing a small vibration motor.
Figure 8A:
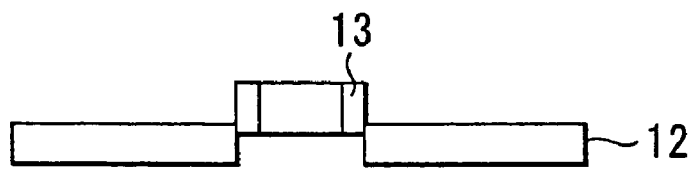
FIGS. 8A to 8C are schematic views explaining a process for manufacturing a small vibration motor.
Figure 8B:
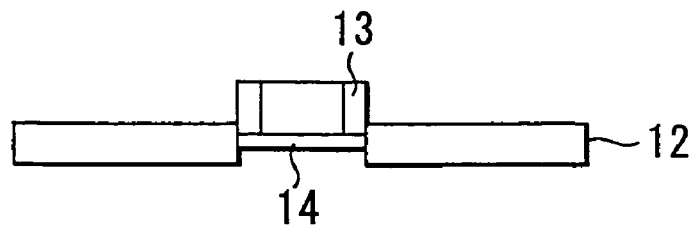
Figure 8C:
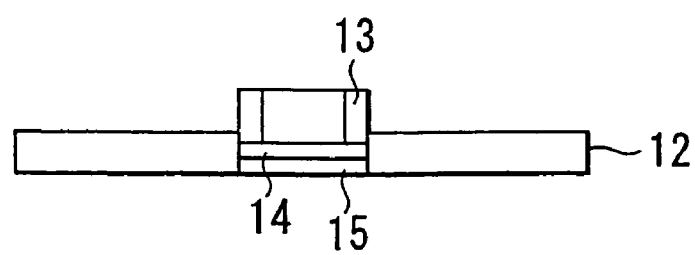

A bottom plate is prepared in order to package the small vibration motor (Step S20 in FIG. 4). The bottom plate 12 is manufactured by performing a rolling process on an aluminum plate and the like. At first, as shown in FIG. 8A, the radial bearing 13 is installed onto the bottom plate 12 (Step S22). Then, as shown in FIGS. 8B to 8C, the thrust bearing 14 and the thrust bearing holder 15 are installed (Step S24) and caulked and thereby fixed (Step S26). Next, whether or not the radial bearing 13, the thrust bearing 14 and the thrust bearing holder 15 are rightly installed is inspected (Step S28). Here, if any of them has a defect, it is discarded (Step S30). On the other hand, if they have no defect, the operational flow proceeds to a next process which will be described later.

B-4. Rotor Yoke Process

Figure 5:
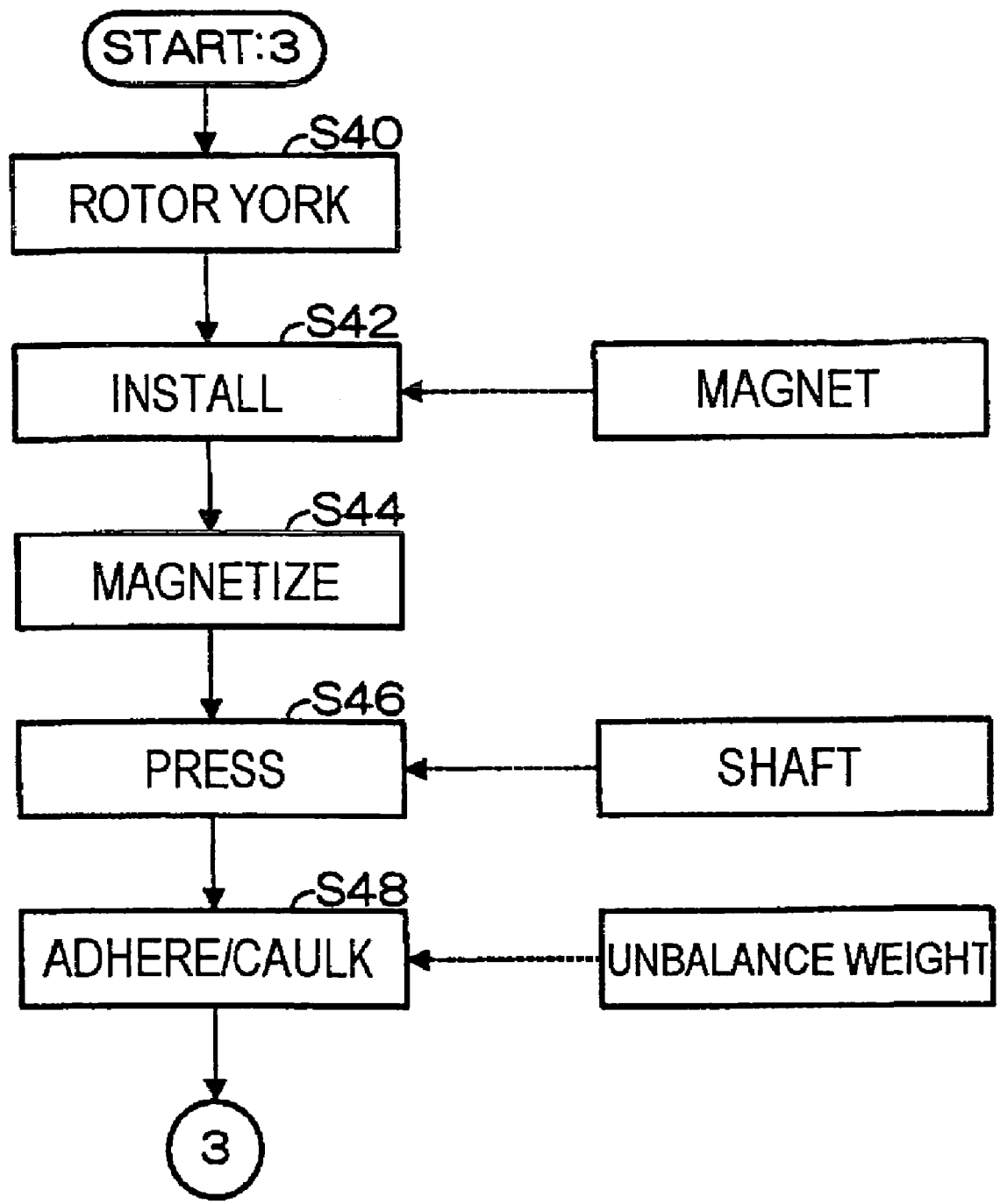
FIG. 5 is a flowchart showing a process for manufacturing a small vibration motor.
Figure 6:
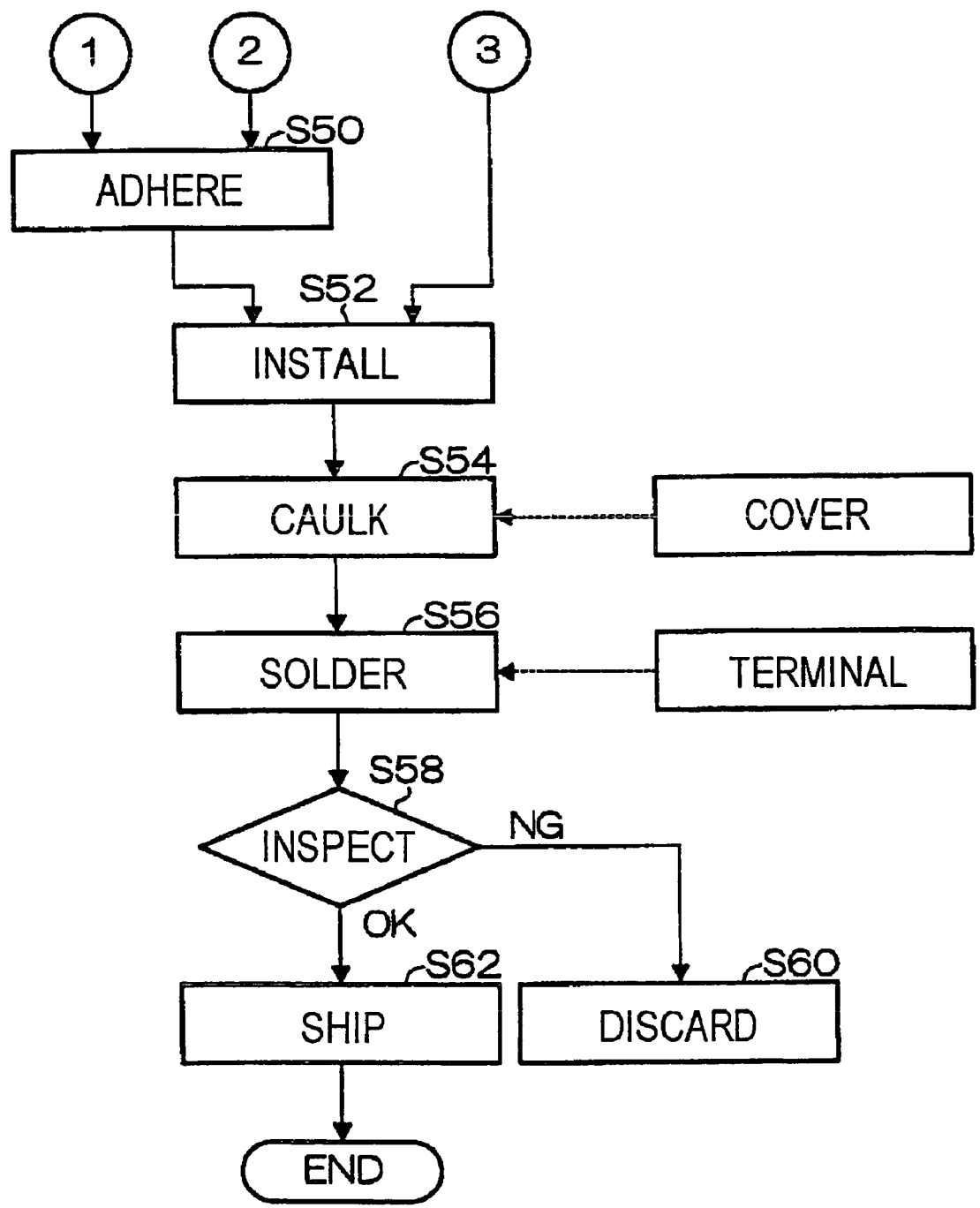
FIG. 6 is a flowchart showing a process for manufacturing a small vibration motor.
Figure 9A:
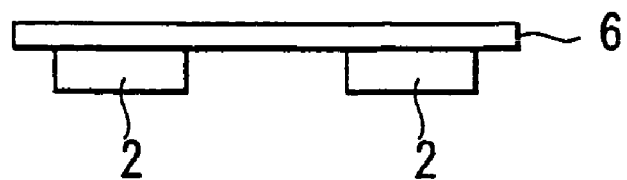
FIGS. 9A to 9C are schematic views explaining a process for manufacturing a small vibration motor.
Figure 9B:
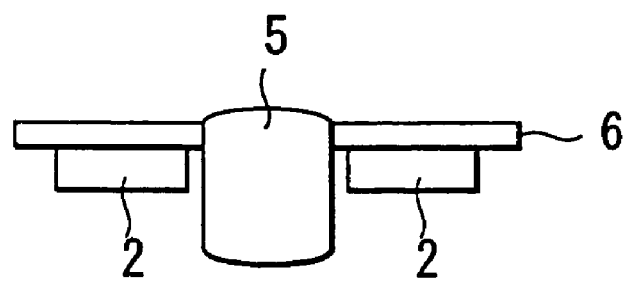
Figure 9C:
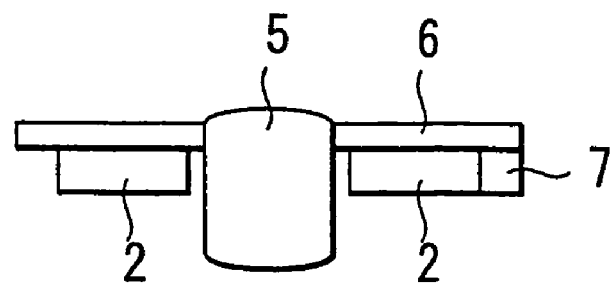

The rotor yoke 6 is prepared (Step S40 in FIG. 5). As shown in FIG. 9A, the magnets 2 are adhered (Step S42). Then, the magnets 2 are magnetized (Step S44). As shown in FIG. 9B, the shaft 5 is pressed into the rotor yoke 6 (Step S46). Then, as shown in FIG. 9C, the unbalance weight 7 is adhered and caulked and thereby fixed to the rotor yoke 6 (Step S48).

B-5. Assembling Process

Figure 10A:
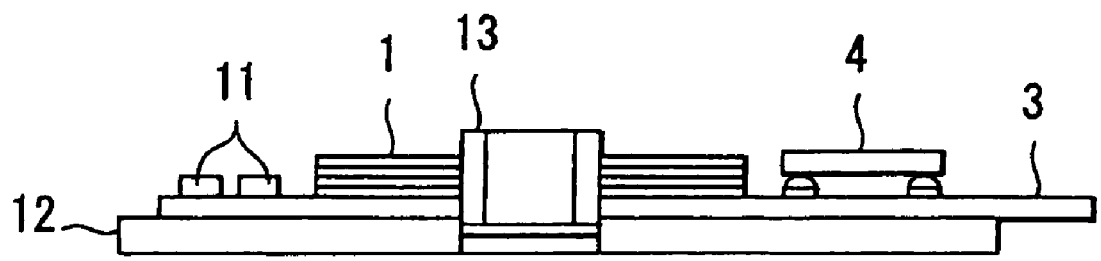
FIGS. 10A to 10C are schematic views explaining a process for manufacturing a small vibration motor.
Figure 10B:
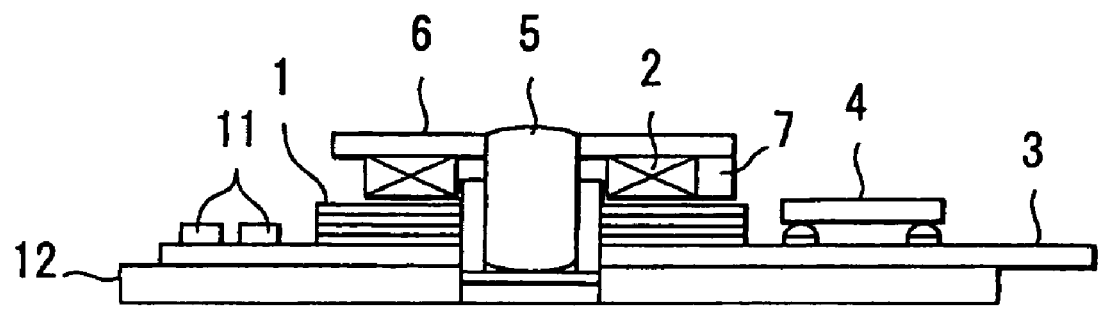
Figure 10C:
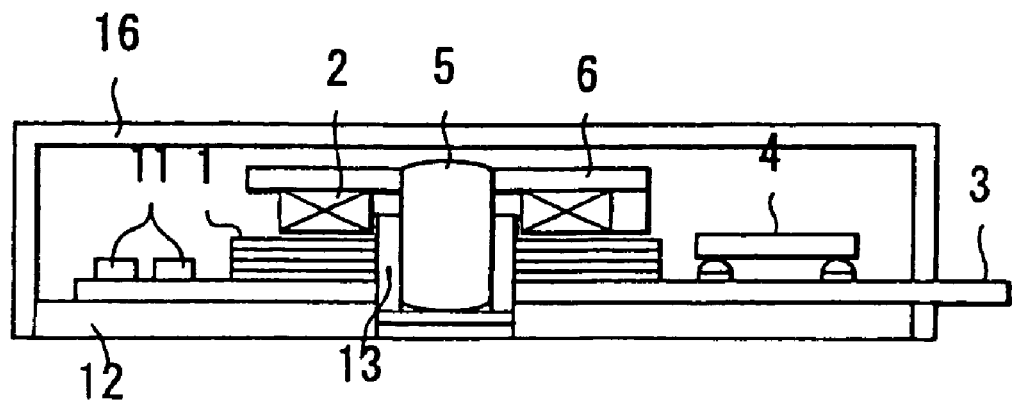

Next, as shown in FIGS. 10A and 10B, the flexible substrate 3 formed by the above-mentioned flexible substrate process, on which the parts are mounted, is adhered on the bottom plate 12 manufactured by the process for installing the radial bearing as mentioned above. (Step S50 in FIG. 6). Next, as shown FIG. 10B, the shaft 5 and the rotor yoke 6 manufactured by the above-mentioned rotor yoke process are installed to the radial bearing 13 (Step S52). Next, as shown in FIG. 10C, the differently manufactured cover 16 is caulked and thereby fixed to the bottom 12 (Step S54), and a terminal to be electrically connected to the motherboard is soldered to the protrusion portion of the flexible substrate 3 (Step S56). Then, an appearance check and an electrical inspection are carried out (Step S58). If there is any defect, the vibration motor is discarded (Step S60). On the other hand, if there is no defect, the vibration motor is shipped (Step S62). Manufacturing the small vibration motor 30 is completed as described above.

The small vibration motor 30 according to the above-described embodiment can be miniaturized and thinned. As compared with a conventional motor with a brush, the longitudinal and lateral dimension of the small vibration motor 30 is about 8.6×8.6 mm, and thickness is about 1.9 mm, and its volume is about 140 mm$^3$. Thus, this motor has a volume substantially equal to ½ to ⅓ of the conventional motor. In addition, because the driver IC can be mounted as the bare chip, it is advantageous in that the chip manufacturing processes may be reduced. Further, the rotation of the rotor yoke 6 inside helps to increase the cooling efficiency.

Also, since the vibration motor 30 has the driver IC 4 therein, mounting on the motherboard (not shown) can be treated similarly to mounting the surface mount parts. At this time, the mounted direction of the small vibration motor 30 needs to be recognized. In order to indicate the mounting direction, a simple mark 31 may be printed as shown in FIGS. 11A and 11B, or a part of the outer surface may be cut away as a notch 32, as shown in FIG. 11C.

In addition, as the methods of mounting the small vibration motor 30 on the motherboard, there are: a method of using an FPC (Flexible Printed Circuit Board) connector 40 electrically connected to the terminal formed on the protrusion section of the flexible substrate 3, as shown in FIG. 12A; a method of using sockets 41 that are engaged with a terminal placed in a package to be electrically connected, as shown in FIG. 12B; and a method of forming lands 42 on the rear surface of the small vibration motor 30 to mount on the motherboard like the surface mount part. In these ways, it is possible to address flexibly a request from a client.

Figure 13:
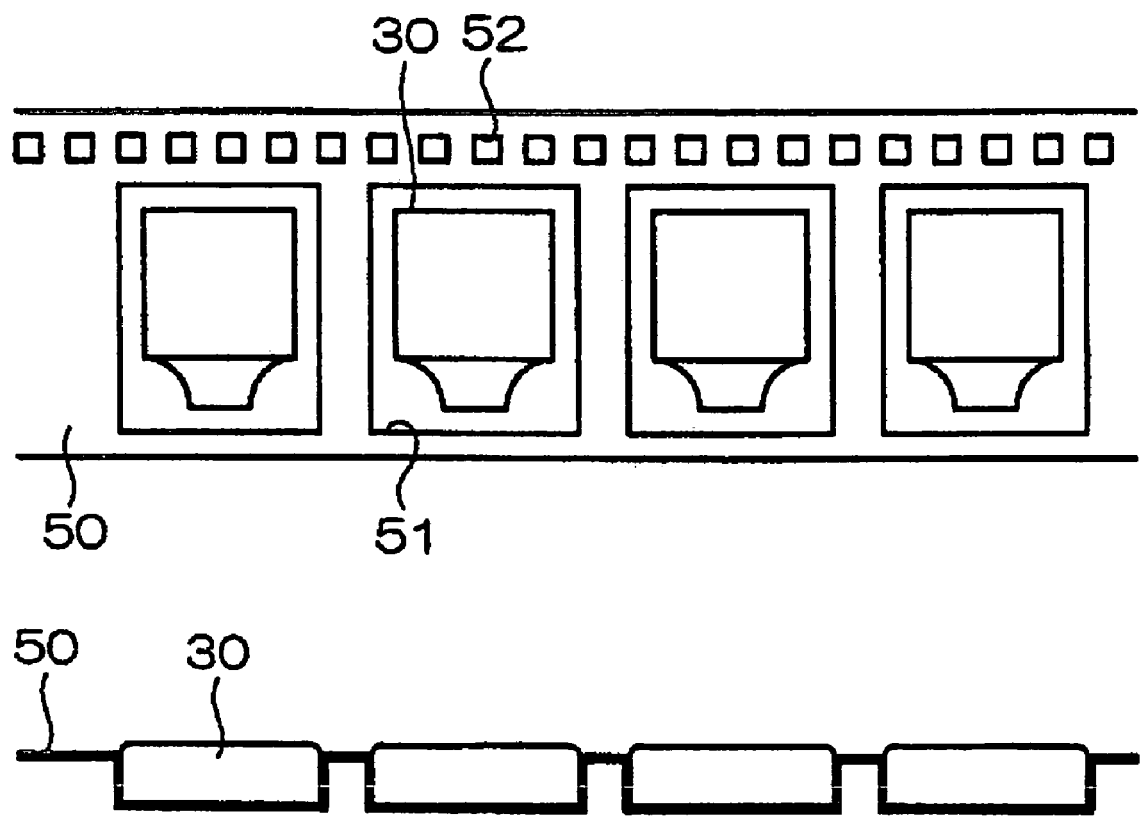
FIG. 13 is a schematic view showing an example of a shipping/delivering method for the small vibration motor 30.

Also, as a parts shipment/delivery method for the vibration motor 30, it is possible to pack it in a reel-shaped tape 50 as shown in FIG. 13, which enables easier management of parts. The small vibration motor 30 is stored in a small, vibration-motor storing portion 51 of the reel-shaped tape 50, which has reel wheel holes 52.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A method of manufacturing a small vibration motor, comprising the steps of:
    mounting driving electronic parts and a driving torque generating coil on a substrate;
    placing a magnet on a rotor yoke in a rotor comprising said rotor yoke and a shaft so as to face said driving torque generating coil;
    placing an unbalance weight at a part of said rotor yoke;
    fixing a radial bearing to a bottom plate; installing said bottom plate, on which said radial bearing is placed, to said substrate;
    installing said rotor to said radial bearing which is engaged with said shaft; and
    packaging by covering said substrate, said driving electronic parts and said rotor with a cover, and adhering said cover to said bottom plate.

2. The method of manufacturing the small vibration motor, according to claim 1, wherein as said driving electronic parts, at least an integrated circuit comprising non-molded bare chips is mounted on said substrate.

3. The method of manufacturing the small vibration motor, according to claim 1, wherein said substrate comprises a flexible substrate, and said driving torque generating coil is electrically connected to said flexible substrate through three terminals.

4. The method of manufacturing the small vibration motor, according to claim 1, further comprising a step of forming a terminal on a substrate protruded from said package, which is engaged with a connector mounted on a motherboard, and thereby electrically connected.

5. The method of manufacturing the small vibration motor, according to claim 1, further comprising a step of placing a terminal on said package, which is engaged with a socket mounted on a motherboard, and thereby electrically connected.

6. The method of manufacturing the small vibration motor, according to claim 1, further comprising a step of forming a land on a surface in contact with said motherboard of said package, which is electrically connected to another land formed on a motherboard.

* * * * *